(12) United States Patent
Bouillet et al.

(10) Patent No.: US 8,768,612 B2
(45) Date of Patent: Jul. 1, 2014

(54) STREAM PROCESSING BASED INTELLIGENT TRANSPORT SYSTEMS

(75) Inventors: Eric Bouillet, Englewood, NJ (US); Mark David Feblowitz, Winchester, MA (US); Zhen Liu, Tarrytown, NY (US); Anand Ranganathan, Stamford, CT (US)

(73) Assignee: International Business Machines Corporation, Armonk, NY (US)

( * ) Notice: Subject to any disclaimer, the term of this patent is extended or adjusted under 35 U.S.C. 154(b) by 1520 days.

(21) Appl. No.: 12/131,784

(22) Filed: Jun. 2, 2008

(65) Prior Publication Data

US 2009/0048776 A1    Feb. 19, 2009

Related U.S. Application Data

(60) Provisional application No. 60/941,316, filed on Jun. 1, 2007.

(51) Int. Cl.
*G06F 17/00* (2006.01)
*G06F 19/00* (2011.01)
*G01C 21/32* (2006.01)
*G01C 21/34* (2006.01)

(52) U.S. Cl.
USPC ....... 701/409; 701/430; 701/455; 340/995.15

(58) Field of Classification Search
USPC ......... 701/32, 33, 35, 36, 200, 201, 202, 206, 701/208, 209, 210, 1, 400, 409, 410, 411, 701/430, 450–455, 461; 340/988, 995.1, 340/995.11, 995.14, 995.15, 995.18, 995.19

See application file for complete search history.

(56) References Cited

U.S. PATENT DOCUMENTS

| | | | |
|---|---|---|---|
| 5,247,694 A * | 9/1993 | Dahl | 712/13 |
| 5,519,619 A * | 5/1996 | Seda | 701/201 |
| 6,980,906 B2 | 12/2005 | Kao et al. | |
| 7,043,357 B1 | 5/2006 | Stankoulov et al. | |
| 7,089,110 B2 | 8/2006 | Pechatnikov et al. | |
| 7,113,852 B2 | 9/2006 | Kapadia et al. | |
| 7,120,539 B2 | 10/2006 | Krull et al. | |
| 7,133,771 B1 * | 11/2006 | Nesbitt | 701/202 |
| 7,184,886 B1 | 2/2007 | Krull et al. | |
| 7,664,891 B2 * | 2/2010 | George | 710/33 |

* cited by examiner

*Primary Examiner* — Thomas Tarcza
*Assistant Examiner* — Edward Pipala
(74) *Attorney, Agent, or Firm* — F. Chau & Associates, LLC; Louis J. Percello, Esq.

(57) ABSTRACT

A stream processing system for processing a routing request specifying a first location and a destination location in a network of interconnected locations includes a plurality of data processing elements, a memory connected to the plurality of data processing elements for storing a plurality of maps having different scopes, wherein each of the data processing elements is associated with one of the plurality of maps and determines a section of a path from the first location to the destination location in the network of interconnected locations, and a routing selection element for merging the sections of the path as a solution to the routing request.

19 Claims, 6 Drawing Sheets

STREAM PROCESSING BASED INTELLIGENT TRANSPORT SYSTEMS

CROSS-REFERENCE TO RELATED APPLICATION

This application claims the benefit of Provisional Application No. 60/941,316 filed on Jun. 1, 2007 in the United States Patent and Trademark Office, the contents of which are herein incorporated by reference in its entirety.

STATEMENT REGARDING FEDERALLY SPONSORED RESEARCH OR DEVELOPMENT

This invention was made with Government support under Contract No.: H98230-05-3-0001 awarded by Intelligence Agencies. The Government has certain rights in this invention.

BACKGROUND

1. Technical Field

The present invention relates to stream processing, and more particularly to a system and method for processing arbitrary routing queries.

2. Discussion of Related Art

Consider the problem of simultaneously computing individual routes for an arbitrary number (e.g., millions) of vehicles across an arbitrarily large (e.g., billions of road sections and intersections) road network. As vehicles move along their assigned routes, and road conditions vary, the routes must be periodically updated, resulting into a continuous flow of requests.

One challenge is that the data footprint and the complexity of the routing algorithm is polynomial with the level of details of the road maps. Routing algorithms need increasing amount of processor power and memory resources to function, and cannot be solved using monolithic approaches when dealing with detailed maps, e.g., maps coving the United States of America.

Efficient routing algorithms do exist to solve the routing problem in very large size networks (Dijsktra, Bellman-ford). In the telecommunication industry, distributed extensions of the Dijkstra algorithm have been developed to solve this problem in a scalable manner (e.g., Open Shortest Path First), and similar approaches have been developed for transportation routing services. Those solutions involve multi-tiered or hierarchical network representations for the routing. They approach the problem by decomposing maps into layers, where each layer provides a tradeoff between the scope of the map (size of area covered by map), and the level of details of the map (inversely proportional to the size). For example, they include a backbone area at the core which interconnects border areas at the edge and a top-down algorithm that distributes the routing effort between the various tiers. Lower tiers are responsible for computing route sections (e.g., street level details) to access route sections calculated in the upper-tier (e.g., highways). The disadvantage is that the information becomes summarized in the upper tiers, and mainly includes highways interconnecting larger cities. It thus offers limited and suboptimal routing alternatives in those areas compared to a flat network representation where all routes, small and large, are considered for an end to end routing.

Furthermore, existing routing architectures tend to be service oriented and transactional in nature, and are not suitable for use in adaptive stream processing applications.

Therefore, a need exists for a system and method of stream processing for processing arbitrary routing queries.

BRIEF SUMMARY

According to an embodiment of the present disclosure, a stream processing system for processing a routing request specifying a first location and a destination location in a network of interconnected locations includes a plurality of data processing elements, a memory connected to the plurality of data processing elements for storing a plurality of maps having different scopes, wherein each of the data processing elements is associated with one of the plurality of maps and determines a section of a path from the first location to the destination location in the network of interconnected locations, and a routing selection element for merging the sections of the path as a solution to the routing request.

According to an embodiment of the present disclosure, a computer readable medium is provided embodying instructions executable by a processor to perform a method for processing a routing request. The method includes receiving the routing request from an input stream, wherein the routing request specifies a unique request identification, a first location and a destination location in a network of interconnected locations, computing, by a first routing module, an initial path between the first location and the destination location in the road network using a first map have a first scope, transmitting the initial path to a subsequent routing module, refining, by the subsequent routing module, the initial path using a subsequent map having a second scope comprising greater detail than the first scope to determine a refined path, transmitting the initial path and the refined path to a routing selection module, computing, by the routing selection module, a final end-to-end path as a merge of the initial map and the refined path, and outputting the final end-to-end path.

BRIEF DESCRIPTION OF THE SEVERAL VIEWS OF THE DRAWINGS

Preferred embodiments of the present disclosure will be described below in more detail, with reference to the accompanying drawings.

DETAILED DESCRIPTION

According to an embodiment of the present disclosure, processing elements or building blocks are composed into a stream processing application to solve a routing problem. The building blocks can be distributed and their functions replicated for parallel processing. Building blocks include individual road maps varying in size and details. The building blocks use their respective road map information to assist each other in providing part of the solution to the overall routing problem or merge and reconcile partial solutions provided by other building blocks and construct the optimal solution.

A stream processing framework is implemented for arbitrary routing. An exemplary stream processing application uses many interconnected modular, reusable software components called modules. Modules have input and output ports. They receive structured data, called Stream Data Object (SDO), of certain content and format on their input ports, process the received SDOs, and produce new SDOs to their output port(s), which are written to streams. Streams are unidirectional channels interconnecting module output ports to other module input ports. The input of a stream is connected to the output port of one writer module, and its output connects to the input ports of 0, 1 or more reader modules. Modules are deployed in a Stream Processing Core (SPC) infrastructure, a runtime environment that supports the deployment of stream processing applications. SPC provides an execution context for the modular applications and the mechanism to transports the SDOs on the streams between the modules. Traffic data come from many heterogeneous sources
as streams, in different forms, content and quality Modules are the building blocks of the routing algorithm and are labeled as routing modules in the figures. Together they comprise the distributed stream processing application that determines a route (e.g., a shortest route or a route for reduced fuel consumption). Data sources deliver streaming data into the system and modules perform various types of operations on streaming data—filtration, annotation, transformation, stream join, etc. Modules are individually deployable and reusable software components and are interconnected by multi-access streams (e.g., single-writer, multiple-reader).

Figure 1:
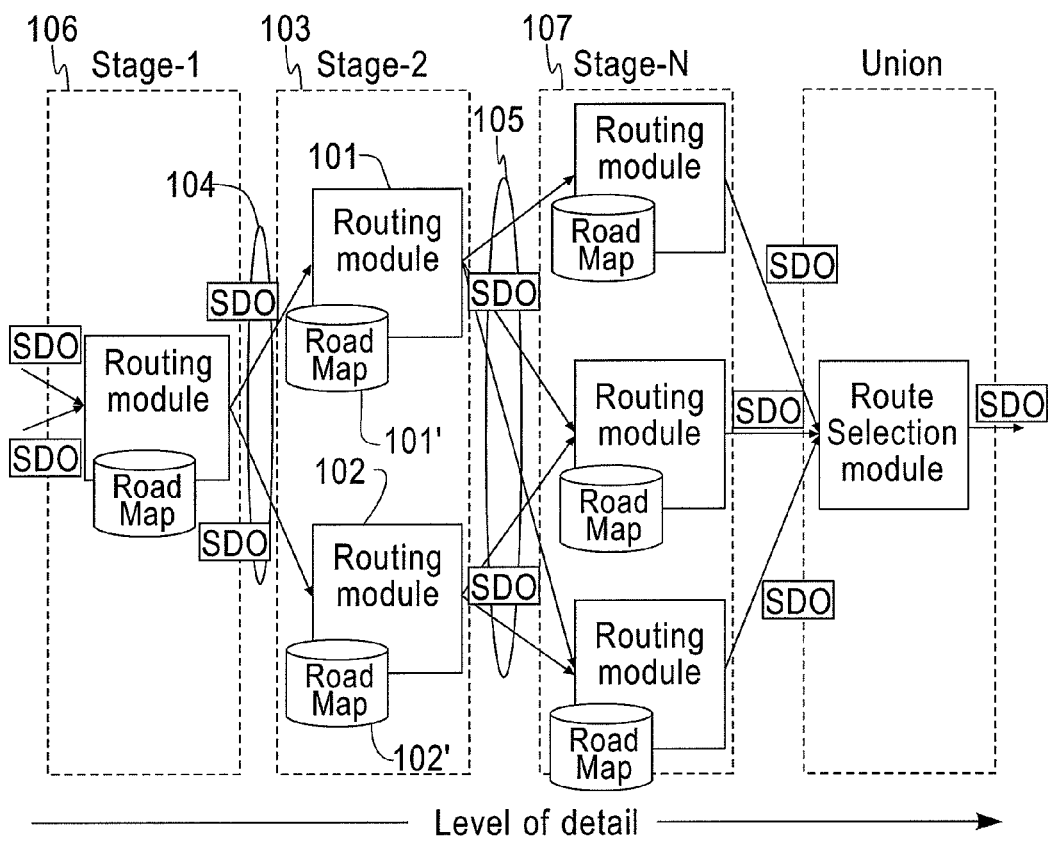
FIG. 1 is a diagram of a multi-stage routing layout according to an embodiment of the present disclosure.

Routing modules have access to different type of road map information, with different level of details and accuracy. The modules are organized in a multi-stage network topology, as shown in FIG. 1, to express the different scope (size of map area), and level of road map details (inversely proportional to size of map area), available to the modules. These interconnected, reusable routing modules, are arranged in stages for processing information generated by modules in a previous stage. Each module in a stage improves the routing information generated by modules in the previous stage.

In this arrangement, modules that have access to maps of similar size and level of details are arranged in the same stage. For example, modules 101-102 are arranged in the same stage 103 and have access to each map 101'-102' in the stage 103. Modules in a same stage are aligned vertically, and the different stages are aligned from left to right, ordered by increasing level of road map details. Modules in a stage receive routing request SDOs from streams produced by modules in the stage on their left, and sends SDOs to one or more modules in the stage on their right. For example, modules 101-102 in stage 103 receive routing request SDOs 104 from streams produced by modules in stage 106, and sends SDOs 105 to one or more modules in stage 107.

Note that this multi-stage layout is shown for illustration purpose only, and the disclosure is not restricted to a particular module topology; more generally modules only need to be interconnected in such a way that routing modules with lower level of road map details sends SDO to routing modules with access to maps of equal or higher accuracy.

Road map information available to the modules includes nodes (e.g., cities, home addresses, turns, intersections, etc.) and connections between nodes. Connections can be actual route sections, which are referred to as physical connections, and include detailed information about the route (such as actual length, travel times, max vehicle weights or heights, etc) that can be used by the routing algorithm in the modules. Connections can also represent the existence of routes connecting the nodes, and include summarized information, such as average distances and travel time, etc. This second type of connection is referred to as a virtual connection, because they do not specify an actual route. The maps also include regions that delimit areas of arbitrary shape and size—possibly overlapping. Every connection (physical and virtual) can traverse a set of any number of such regions.

Figure 2:
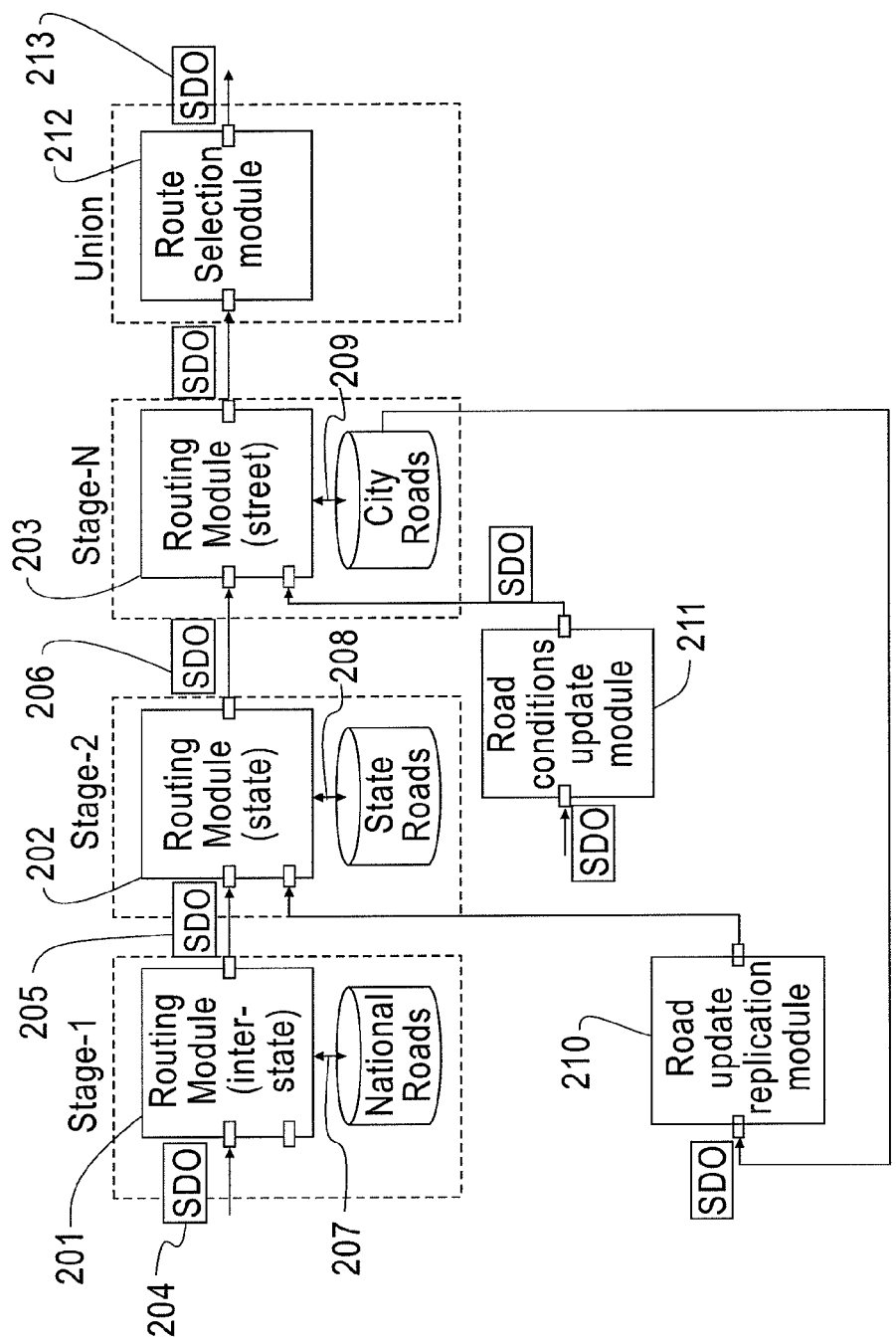
FIG. 2 is a diagram of a stream processing framework according to an embodiment of the present disclosure.

Updates to the road map information and access to that information from the modules can be done in various ways. For example, a module can pull data from a road map database and/or the module can receive road-map updates in the form of SDOs on a dedicated input port and cache it in memory. An example of this is shown in FIG. 2 with routing modules 201-203 that receive routing request SDOs 204-206 on one of their input ports, and road map updates 207-209 on the other. Road map updates can be generated by other stream processing modules 210-211. Road map update can be addition/removal of a connection, or modifications of the properties of a connection (e.g., change of travel speed, due to traffic congestions, accidents, etc.). Applications that generate the road map updates may obtain their information from sensor networks, real-time traffic reports services, etc.

Multiple applications can be used to handle different types of road map updates. Another exemplary map update application detects changes in the most accurate maps (modules in latest stage), and periodically updates the virtual connections in the less accurate maps (used by modules in earlier stages).

Where the number of external sources of map updates becomes too large for applications to handle, partial results produced by the routing modules can be used to drive the applications that updates the map, so that they limit their search to areas of interest that are traversed by the vehicles.

The maps available to the first stage module will be highly connected, cover a larger area, and include virtual connections with static and low level of details. Regions for those maps will also be of larger size (e.g., state-wide). Maps available to modules in subsequent stages will cover smaller areas, and include a higher proportion of physical connections to virtual connections. Regions in the more accurate maps are also smaller in size (e.g., zip code area). Those maps can be more dynamic, and change more frequently. The frequency of change/updates is related to the number of physical connections, which correspond to actual infrastructures that can be monitored, instead of virtual connections with summarized, slow varying, information.

Figure 3:
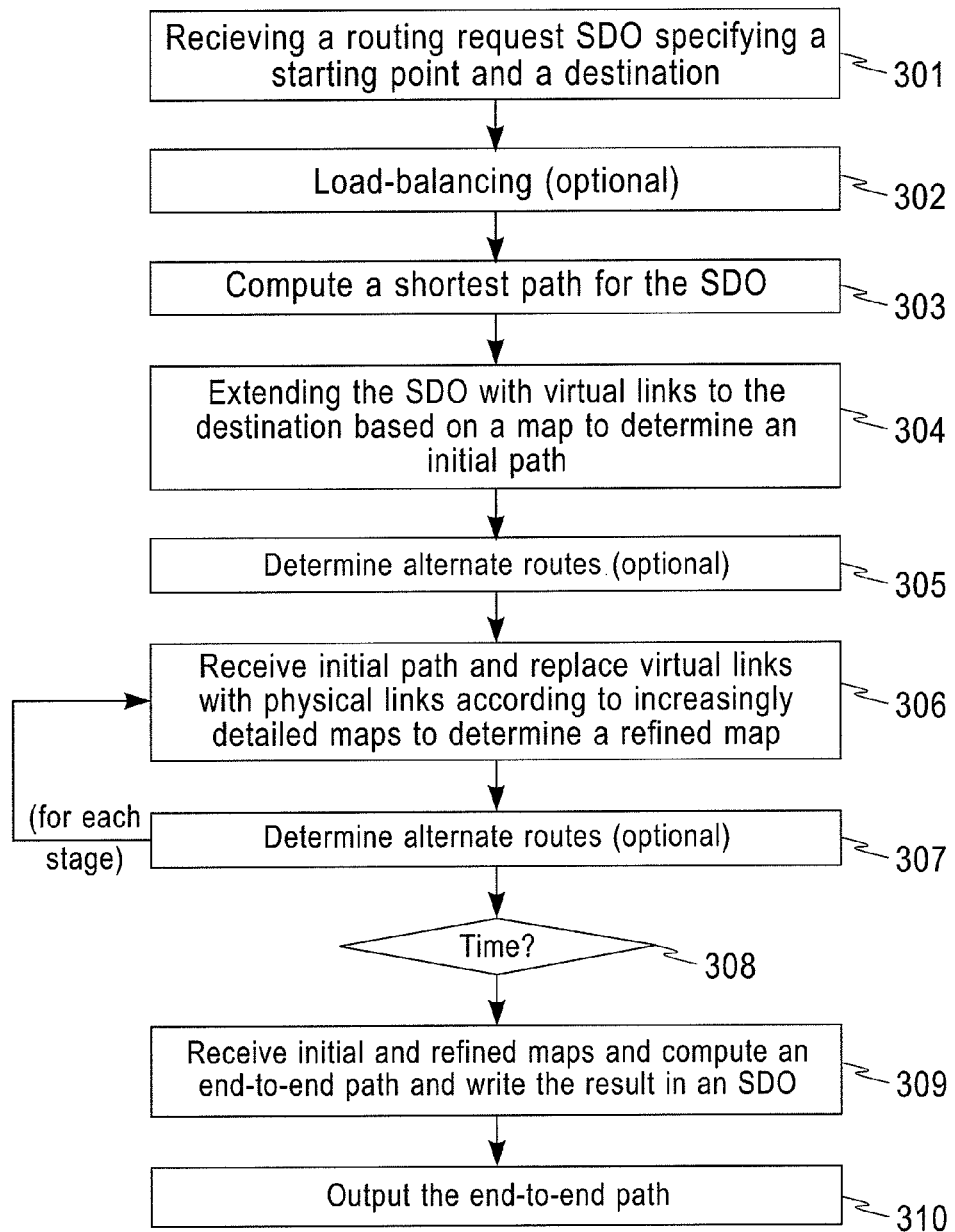
FIG. 3 is a flow diagram of a method for processing arbitrary routing requests according to an embodiment of the present disclosure.

In the configuration shown in FIG. 2 and with reference to FIG. 3, an exemplary operation receives routing requests as SDO 204 from one or more input streams (generated by one or more other streaming applications not shown in the figure) 301. The request SDO 204 are processed by the modules 201-203 in each stage from left to right. Initially the routing request headers include a unique request ID, a starting point (e.g., a current vehicle location, as an address, GPS coordinates, etc.), and a travel destination. The header can also include additional information, such as vehicle type, etc., which can be used by the routing modules to constrain or provide hints for the routing, such as in the case of limited access roads.

The request SDO 204 is received by a module 201 in the first stage (Stage-1). This module 201 can be duplicated and a load-balancing mechanism can be used to distribute the requests between the duplicated modules in the first stage 302. The load-balancing can, for example, use a round-robin approach, select the module based on hash function of the request ID, make a random selection, or use module load-measurement.

The first stage modules 201 compute a shortest path using any known routing algorithm on a coarse representation of the road network 303. The header of its output SDO 205 includes the header of the input SDO 204 extended with a set of virtual links, and possibly physical links, between the main cities or road intersections that the vehicle should traverse to reach the travel destination from the current location 304. The header can also include the regions traversed by those virtual links. The union of those regions constitute a route "corridor" for the vehicle. The module 201 sends one such SDO to all the downstream modules 202 connected on its right. The module can compute alternate routes for the vehicle 305 using, for example, a K-shortest path algorithm using different set of connections. Those alternate routes are sent in separate SDOs.

Downstream modules 202 on the receiving side of the SDO 205 are assigned one or more regions. For example, modules for each state (e.g., 202), county, city (e.g., 203), etc. Regions assigned to different modules can be overlapping. The modules select all SDOs on their input that contain corridors that intersect with one of their assigned region. Other SDOs are ignored. Each downstream module looks for virtual connections in the selected SDOs, and performs a routing algorithm to try to replace each of them with corresponding physical connections or a chain of shorter physical and logical connections according to the level of details provided by their maps within the scope of their regions 306. The module can compute alternate physical connections to replace the virtual connections 307. Each alternate solution is sent to the next module in a different SDO. Further, modules can cache the solutions to replace the most popular virtual connections and use cached values if available for subsequent routing request SDOs.

While traversing the various stages, the initial routing request SDO 201 is duplicated and results in several SDOs 205-206, each of which holds a fragment of the final solution to the routing request. These fragments are recombined by a route selection module 212 located in the rightmost stage (union) of the routing process. This is shown as a single module 212, but the process can be distributed among several modules in parallel (e.g., each module can handle a prescribed range of request IDs). The route selection module 212 collects all the SDOs that correspond to a same request ID. It then merges all the physical connections while removing remaining virtual connections. The result of this merge operation is a subgraph of physical connections that the vehicle can use to travel from its current location to its destination. The route selection module 212 waits for a minimum amount of time to receive a sufficient number of SDOs, but no longer than a prescribed timeout value after receiving the first SDO for that route request ID 308. After waiting the route selection module 212 uses the reduced, but highly detailed subgraph, to compute a final end-to-end shortest path and write the result in an SDO 213 if such a path exists 309. The SDO 213 can be rendered into a displayed route and/or list of directions 310. The subgraph is then removed from the module's state, and the route selection module 212 ignores subsequent SDOs corresponding to the same request IDs. In embodiment, the route selection module 212 checks if the subgraph is connected after merging each new SDO to the subgraph before waiting for a minimum amount of time (not more than a prescribed timeout).

In view of the above, each module focuses on individual parts of a problem independently of other modules. The result is a modular progressive information production application that can be extended at runtime with new modules to improve the accuracy of the routing.

The modules can be specialized to handle particular cases without affecting the overall operation of other modules. For example, modules can be owned by different jurisdictions that handle routing differently (e.g., city or state dependent routing).

The framework includes modules that determine partial solutions with route sections that can be good candidates to the solution, and modules that aggregate partial solutions provided by other modules, resolve conflicts and improve the overall solution.

The maps are partitioned and layered according to a tradeoff between accuracy versus footprint size per module (e.g., for optimal spatial distribution of data input and distribution of processing resources). Furthermore, any combinations of modules can be duplicated allowing the flexibility to focus on bottlenecks in the routing application and provide an optimum parallelization of the process. Due to modularity, the parallelization can be adaptive and performed dynamically at runtime.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

Figure 4:
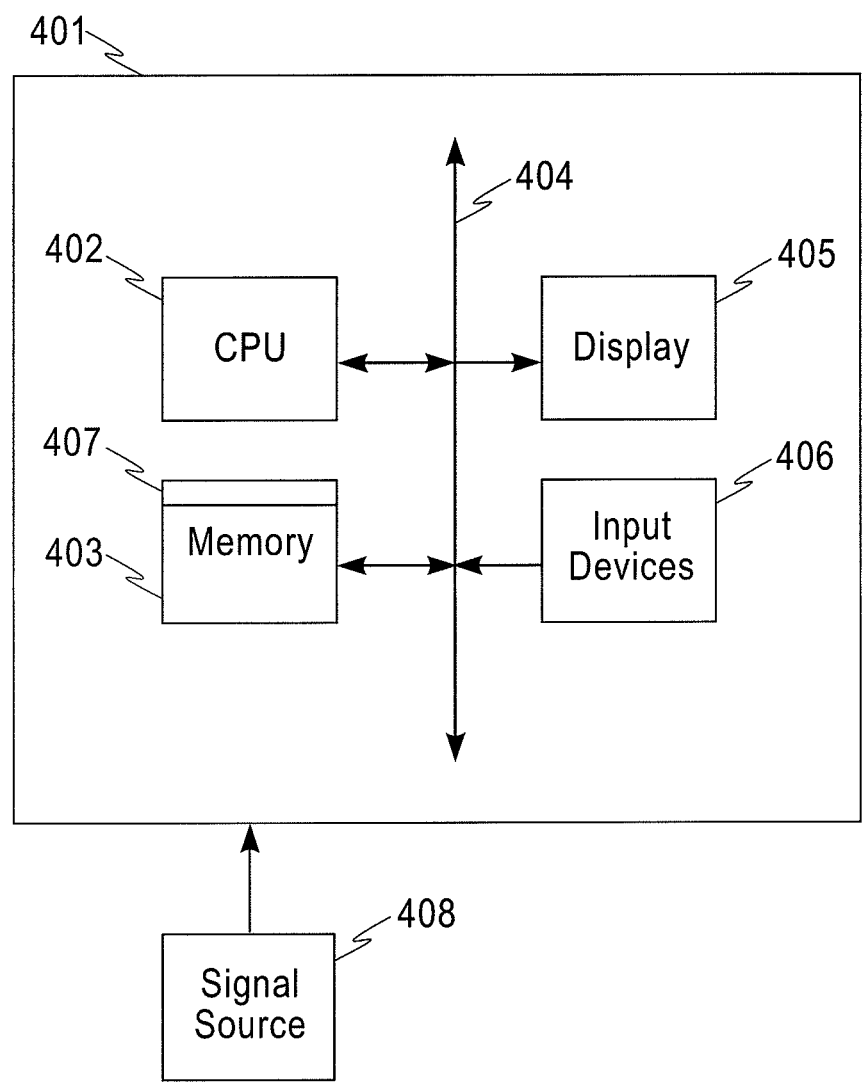
FIG. 4 is a diagram of an exemplary system for processing arbitrary routing requests according to an embodiment of the present disclosure.

Referring to FIG. 4, according to an embodiment of the present invention, a computer system 401 for stream processing that processes arbitrary routing queries can comprise, inter alia, a central processing unit (CPU) 402, a memory 403 and an input/output (I/O) interface 404. The computer system 401 is generally coupled through the I/O interface 404 to a display 405 and various input devices 406 such as a mouse and keyboard. The support circuits can include circuits such as cache, power supplies, clock circuits, and a communications bus. The memory 403 can include random access memory (RAM), read only memory (ROM), disk drive, tape drive, etc., or a combination thereof. The present invention can be implemented as a routine 407 that is stored in memory 403 and executed by the CPU 402 to process the signal from the signal source 408. As such, the computer system 401 is a general purpose computer system that becomes a specific purpose computer system when executing the routine 407 of the present invention.

The computer platform 401 also includes an operating system and micro instruction code. The various processes and functions described herein may either be part of the micro instruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

In an exemplary implementation, routes for a fleet of vehicles (e.g., delivery trucks) are set at the beginning of a shift, informed by any known traffic conditions at the time of departure. There is a standing inquiry for each vehicle; it watches for changes in traffic conditions that warrant route replanning and provide an updated route to the vehicle. The routes are based on a collection of destinations and the current location of the vehicle (e.g., determined by a GPS (global positioning system) transmitter in the vehicle). Accompanying the standing, vehicle-specific routing inquiries are inquiries that examine streaming data from multiple sensors and other sources and update the roadway and traffic conditions, with special focus on corridors covering known vehicle destinations.

Figure 5A:
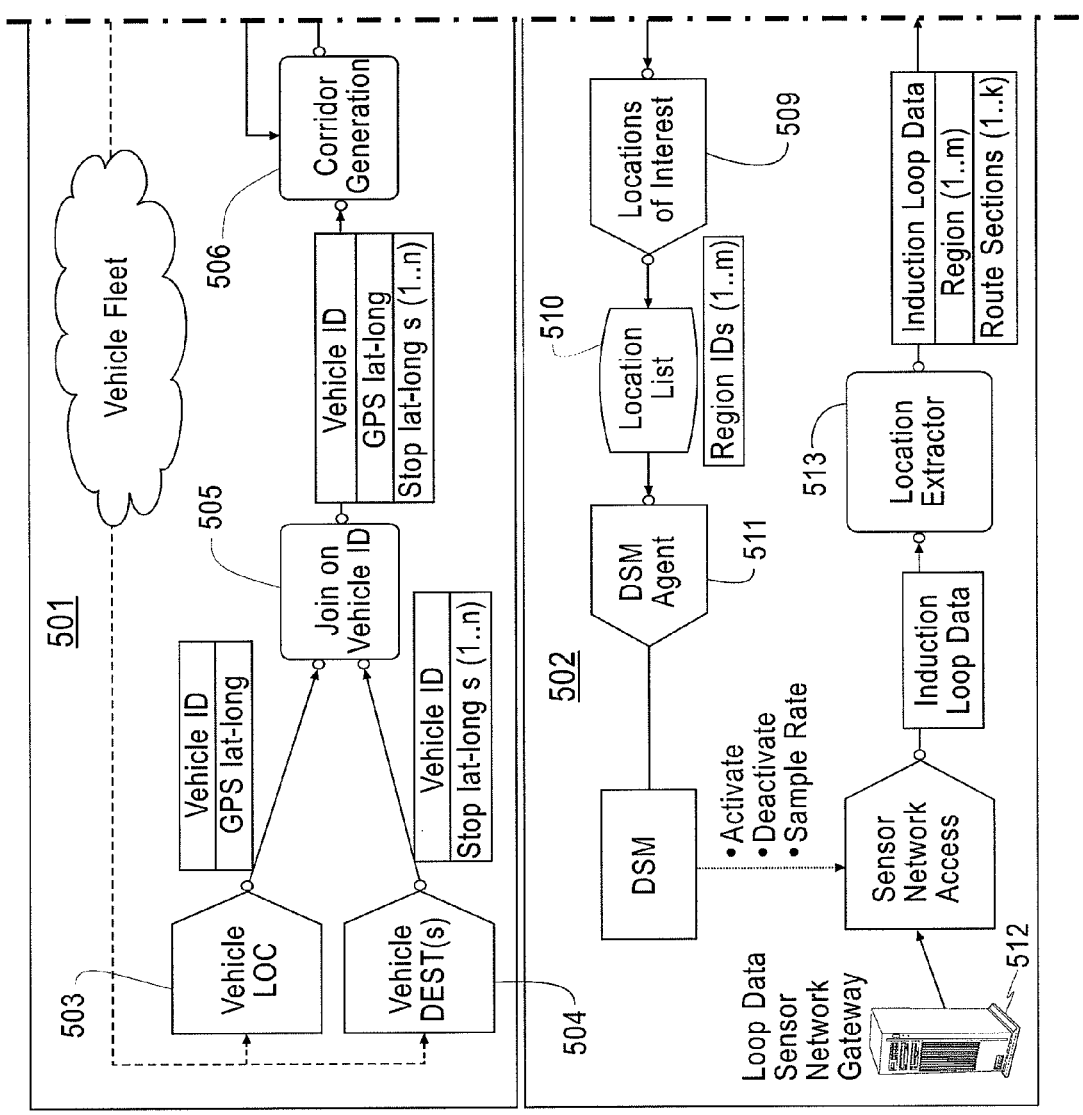
FIG. 5 is a diagram of a stream processing application using the SPC infrastructure according to an embodiment of the present disclosure.
Figure 5B:
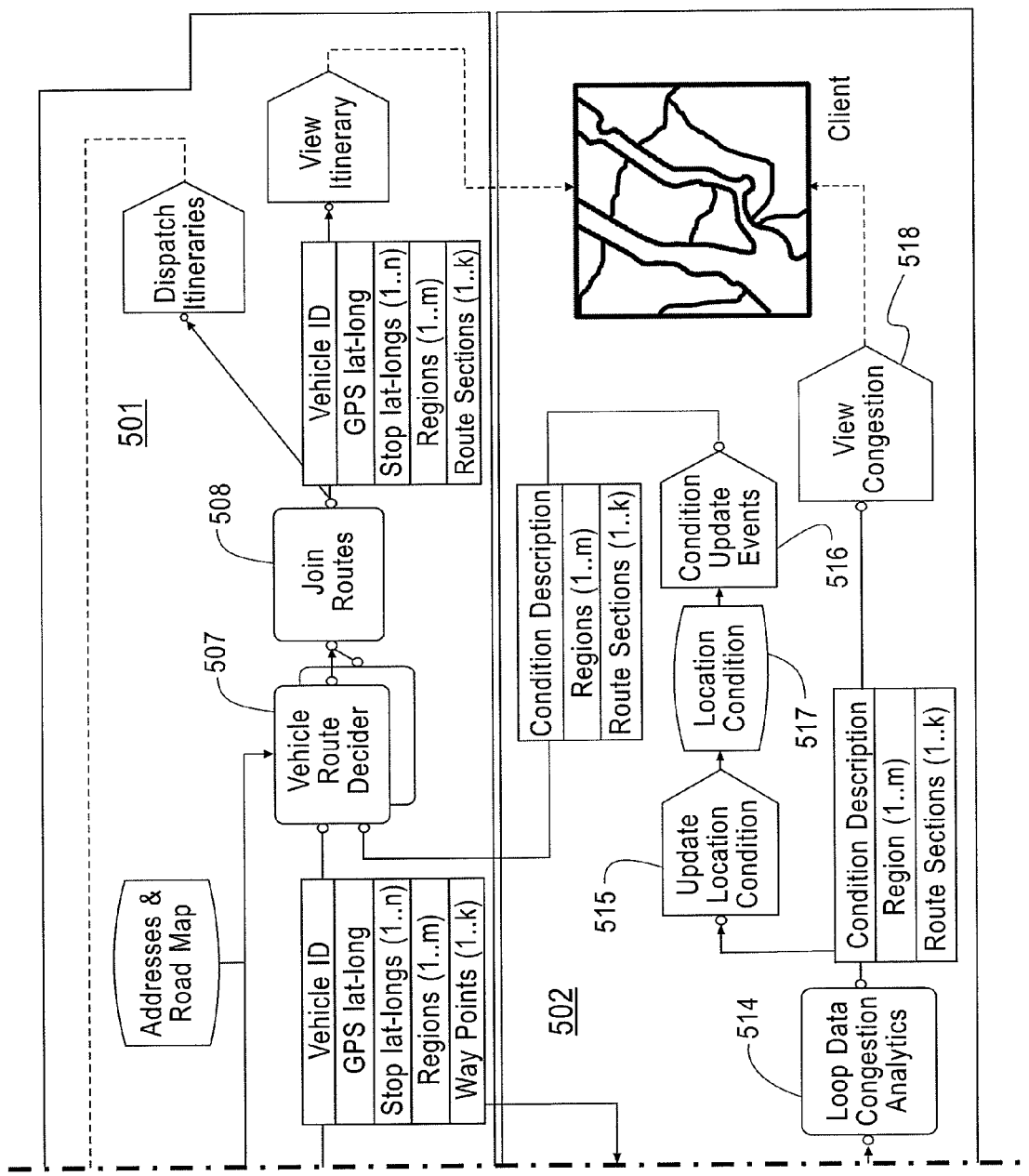

Referring to FIG. 5, a stream processing application is built using the SPC infrastructure, and includes of a set of modules arranged into processing graphs. A route update portion 501 and a location condition update portion 502 are depicted. In the route update portion 501 are the various modules—analytic modules that receive the streaming data and perform functions such as generating the K best potential travel corridors (a corridor delineates a region set of the map that is likely to be traversed by the vehicle), deciding on routes based on vehicle types and, where available, traffic conditions.

Two results of the route update portion 501 are the route updates for the vehicles and updates to the list of currently active locations. The results guide the focus of the condition-assessment processing (in the location condition update portion 502).

A vehicle location module 503 receives data (e.g., GPS, radio, wireless wide area network, etc.) of current vehicle locations and package it into internally streamable and processable SDOs.

A vehicle destination module 504 retrieves a vector of destination coordinates for the vehicle, and packages the vector into SDOs. Various implementations of the module can either pull this information from a database, or receive it directly from user console.

A join vehicle ID module 505 joins the location and the respective destination coordinates of every vehicle received on its input ports. The join vehicle ID module 505 generates a new join SDO, containing the vehicle ID, its current location, and the vector of stop coordinates, when this information changes.

A potential corridor generation module 506 (see stage-1 in FIGS. 1 and 2) generates the corridors that might be traversed by the vehicle. The output SDO is the input augmented with vectors of regions (e.g., states or zip codes) and waypoints (e.g., main cities). For scalability reasons, the potential corridor generation module 506 can use a summarized roadmap information, which is less frequently updated than more specific route information. This is mitigated by configuring the potential corridor generation module 506 to produce multiple SDOs with alternate corridors for the same vehicle.

Vehicle route decider module(s) 507 (see stages2-N in FIGS. 1 and 2) can be assigned to a particular regions (e.g. one module per state). Each module listens for SDOs that contains a corridor intersecting with its region while other SDOs may be ignored, and determines a route (e.g., shortest route, fastest route, avoid tolls, etc.) for the vehicle's within that region. The output SDO is the input SDO augmented with additional route fragments within the region covered by the module.

A join route module 508 (see the route selection module in the union stage in FIGS. 1 and 2) merges the route fragments determined by the various vehicle route decider module(s) 508 into a subgraph and generates an SDO containing a path on the subgraph.

The location condition update portion 502 determines updates in real time based on input, which is analyzed for updating a route based on a current location and a destination associated with a unique vehicle ID. The location condition update portion 502 draws data from one or more data source (e.g., weather sensor networks, accident reports, etc.) and processes the data to determine a location of an event (traffic, accident, rain, etc.) and conditions associated with the event, and updates a location conditions store. This data can be retained for some duration and can trigger rerouting in the route update portion 501.

Other data sources can include non-sensor data sources such as local radio weather report sources or traffic incident report sources. But these are secondary sources, drawn from other service providers, possibly providing stale reports.

For rapidly changing conditions, data can be drawn directly from accessible sensors or sensor networks, using devices such as traffic surveillance cameras, in-road vehicle sensors, wireless sensors capable of sensing temperature, barometric pressure and humidity, infrared remote temperature detectors to detect road surface temperatures, and roadside microphones to analyze traffic noises. Each of these can produce streaming data, which can be processed by many stream processing applications into usable results.

Non-sensor sources, providing information not limited to a single geographic area, may deliver, for example, weather updates that span a wide range. Additional sensors are possible.

The location condition update portion 502 includes additional modules.

A location(s) of interest module 509 stores the corridors locally in the location list database 510 for use by other modules in a condition assessment applications.

A data source manager (DSM) agent 511 translates the location list 510 into semantic queries for the DSM connection management which in turn activates the appropriate source modules to satisfy the requests. There is at least one DSM agent 511 per modality, e.g., weather, traffic report.

A sensor network gateway 512 is a source module specialized to query sensor gateways. DSM connection management dynamically reallocate source modules in response to requests from the DSM agent 511.

A location extractor 513 and loop data congestion analytics 514 are exemplary modules used to assess the road conditions. In this example the modules extract induction loop data from a roadway and analyze its content to estimate the impact on traffic delays.

A condition update module 515-516 persists location conditions (e.g., weather related conditions) to a road condition database 517 are return data to one or more vehicle route decider modules 507.

The application can also includes sink modules (e.g., map vehicle position, view route, and map condition) that present the results of a user inquiry to a user interface (see view configuration 518), or automatically send that information directly to the vehicles.

Having described embodiments for a system and method of stream processing for processing arbitrary routing queries, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

What is claimed is:

1. A stream processing system for processing a routing request specifying a first location and a destination location in a network of interconnected locations, comprising:
a plurality of data processing elements;
a memory connected to the plurality of data processing elements for storing a plurality of maps having different scopes, wherein each of the data processing elements is associated with one of the plurality of maps and determines a section of a path from the first location to the destination location in the network of interconnected locations,
wherein the plurality of data processing elements are arranged in a series of stages having increasing map detail and decreasing map size; and
a routing selection element for merging the sections of the path as a solution to the routing request.

2. The stream processing system of claim 1, wherein the data processing elements annotate the sections with routing information refined by subsequent ones of the plurality of data processing elements to determine the solution to the routing request.

3. The stream processing system of claim 1, wherein the data processing elements approximate the sections for a scope having greater detail than the associated map.

4. The stream processing system of claim 1, wherein each of the data processing elements determines the sections in a respective predetermined region delimiting an area of the network of interconnected locations.

5. The stream processing system of claim 1, wherein the data processing elements delineate a corridor in the network and compute path sections only within the corridor.

6. The stream processing system of claim 1, wherein the path is selected for one of a shortest path, a min-congestion path, a plurality of diverse paths, a constrained path.

7. The stream processing system of claim 1, wherein each stage shares maps having a substantially similar scope.

8. A non-transitory computer readable storage medium embodying instructions executable by a processor to perform a method for processing a routing request, the method steps comprising:
receiving the routing request from an input stream, wherein the routing request specifies a unique request identification, a first location and a destination location in a network of interconnected locations;
computing, by a first routing module, an initial path between the first location and the destination location in the road network using a first map have a first scope;
transmitting the initial path to a subsequent routing module;
refining, by the subsequent routing module, the initial path by determining a physical link for replacing a virtual link in the initial path using a subsequent map having a second scope comprising greater detail than the first scope to determine a refined path;
transmitting the initial path and the refined path to a routing selection module;
computing, by the routing selection module, a final end-to-end path as a merge of the initial map and the refined path; and
outputting the final end-to-end path.

9. A non-transitory computer readable storage medium of claim 8, wherein the method further comprises distributing a plurality of routing requests including the routing request between duplicated modules.

10. A non-transitory computer readable storage medium of claim 8, wherein the initial path comprises a set of virtual links, including the virtual link, the method further comprising replacing the virtual links with the physical links to determine the end-to-end path.

11. A non-transitory computer readable storage medium of claim 8, wherein the method further comprises computing alternate paths for at least one of the initial path, the refined path, and the final end-to-end path.

12. A non-transitory computer readable storage medium of claim 8, wherein the method further comprises computing the final end-to-end path after a predetermined time to receive additional refined paths.

13. A non-transitory computer readable storage medium of claim 12, wherein the predetermined time is no longer than a timeout value after receiving the initial path and the refined path at the routing selection module.

14. A non-transitory computer readable storage medium embodying instructions executable by a processor to perform a method for processing a routing request, the method steps comprising:
receiving the routing request wherein the routing request specifies a first location and a destination location in a network of interconnected locations;
determining an initial path between the first location and the destination location in the network using a first map of a first scope;
refining the initial path by determining a physical link for replacing a virtual link in the initial path using a subsequent map having a second scope comprising greater detail than the first scope to determine a refined path;
determining an end-to-end path as a merge of the initial path and the refined path; and
outputting the end-to-end path.

15. A non-transitory computer readable storage medium of claim 14, wherein the method further comprises distributing a plurality of routing requests including the routing request between duplicated modules.

16. A non-transitory computer readable storage medium of claim 14, wherein the initial path comprises a set of virtual links, including the virtual link, the method further comprising replacing the virtual links with the physical links to determine the end-to-end path.

17. A non-transitory computer readable storage medium of claim 14, wherein the method further comprises computing alternate paths for at least one of the initial path, the refined path, and the end-to-end path.

18. A non-transitory computer readable storage medium of claim 14, wherein the method further comprises computing the end-to-end path after a predetermined time to receive additional refined paths.

19. A non-transitory computer readable storage medium of claim 14, wherein refining the initial path further comprises receiving a route condition, wherein the refined path is determined according to the subsequent map and the route condition.

* * * * *